Oct. 18, 1932.          R. H. WHITE                1,882,679
                          SEAL
                    Filed May 29, 1930         2 Sheets-Sheet 1

INVENTOR
Rollin H. White
BY
Wayne M. Hart
ATTORNEY

Oct. 18, 1932.   R. H. WHITE   1,882,679

SEAL

Filed May 29, 1930   2 Sheets-Sheet 2

INVENTOR
Rollin H. White
BY
Wayne M. Hart
ATTORNEY

Patented Oct. 18, 1932

1,882,679

UNITED STATES PATENT OFFICE

ROLLIN H. WHITE, OF CLEVELAND HEIGHTS, OHIO

SEAL

Application filed May 29, 1930. Serial No. 457,320.

This invention relates to tractors, and more particularly to tractors of the tracklaying type.

Tractors ordinarily operate upon the ground so that the joints between relatively moving elements thereof must be guarded against the entrance of dirt, sand and water because such materials either act as an abrasive or decrease the normal life of elements. The bearings of the lower track rollers are especially subjected to such undesirable element because of their proximity to the ground, and great difficulty has been experienced in sealing the joint around the shaft between the track roller and the shaft bearing.

It is an object of this invention to provide sealing means for the joint around the axles between the bearings and rollers of the lower track rollers of tracklaying tractors which will eliminate the ingress of water and abrasive substances.

Another object of the invention is to provide a seal structure for track rollers of a tracklaying tractor which will maintain a leak-proof relation even though the roller sections become misaligned relative to the associated bearing.

A further object of the invention is to provide a seal structure for the bearing of a lower track roller structure for tracklaying tractors which is uniformly contacting in a circular relation around the shaft and the bearing to prevent the passage of foreign material into the bearing.

Other objects of the invention will appear from the following description taken in connection with the drawings, which form a part of the specification, and in which.

Figure 1:
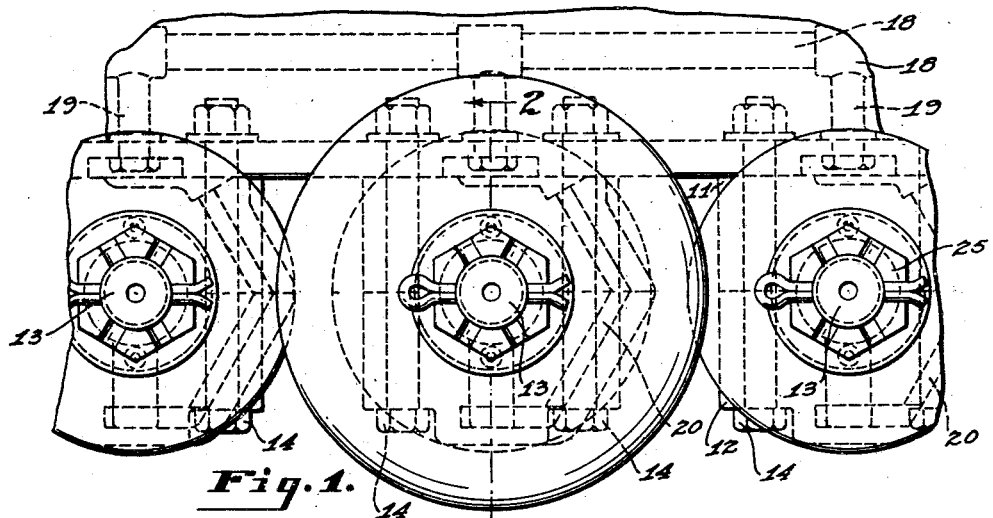
Fig. 1 is a fragmentary side elevational view of a portion of a track-laying tractor showing a plurality of lower track roller structures.
Figure 2:
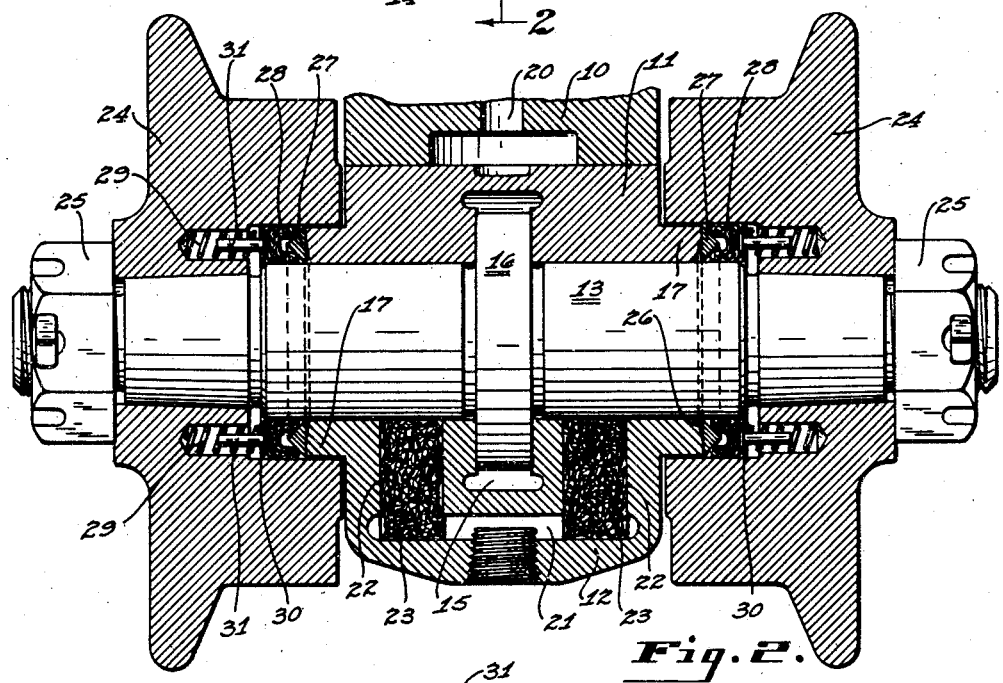
Fig. 2 is a sectional view taken on line 2—2 of Fig. 1.
Figures 3, 4, 5:
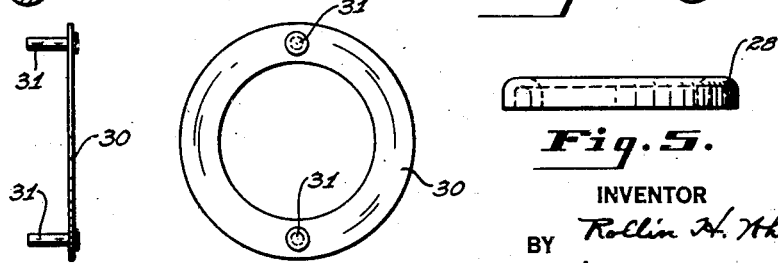
Fig. 3 is an end elevational view of the seal pressure ring.
Fig. 4 is an side elevational view of the pressure ring.
Fig. 5 is a side elevational view of an element of the seal.

Referring to the drawings by characters of reference 10 represents the side frame of a tracklaying tractor to the lower wall of which a plurality of roller structures are secured. With the exception of the sealing means, of which several modifications are shown, the structures are similar so a description of one will suffice.

A two part bearing consisting of an upper section 11 and a lower section 12 carry a shaft 13 and are secured together and to the side frame by bolts 14. The bearing sections are formed to provide a circular chamber 15 into which a thrust flange 16 extending from the shaft is housed. The bearing sections are formed at each side to provide circular projecting extensions 17 through which the shaft extends.

Extending longitudinally in the side frame is a lubricant distributing conduit 18 having branch conduits 19 leading to passages 20 in the bearing which terminate in a reservoir 21. Openings 22 formed in the bearing establish communication between the shaft and the reservoir, such openings carrying wicks 23 through which oil travels to the shaft.

A roller 24 is pressed upon each projecting end of the shaft and nuts 25 are screwed upon reduced ends of the shaft to secure the rollers axially. The inner end of the bores through the rollers are enlarged for the reception of sealing means, and also, so that the bearing extensions can be telescoped by the rollers. The inner face of the end of each bearing extension is chamfered, as indicated at 26, and a triangular steel disc 27 engages the unchamfered face of the bearing extensions. A circular gasket 28, preferably of U-shaped cross section, is associated with each triangular disc, the gaskets being arranged with the open sides partially telescoping the discs. Seated in axially extending openings in the rollers are a plurality of coil springs 29 which engage rings 30 bearing against the gaskets, the rings having spring retaining pins 31 extending therefrom. The gaskets are formed of a waterproof flexible material, and the spring pressure thereagainst wedges the free sides against the rollers and the discs and sealing the space between the shaft and the roller. The springs are equally spaced and will exert a pressure against the gaskets which will follow the position of the discs, even after the end faces of the bearing extensions become worn. The discs being formed of steel, and the bearing extension of softer metal, the discs will maintain a circular seat or contact. The gaskets prevent outward leakage of oil and the ingress of foreign elements between the roller and shaft around the discs, while the spring pressure maintains the discs sealed against the bearing extension faces to prevent passage of foreign elements therebetween.

Figure 6:
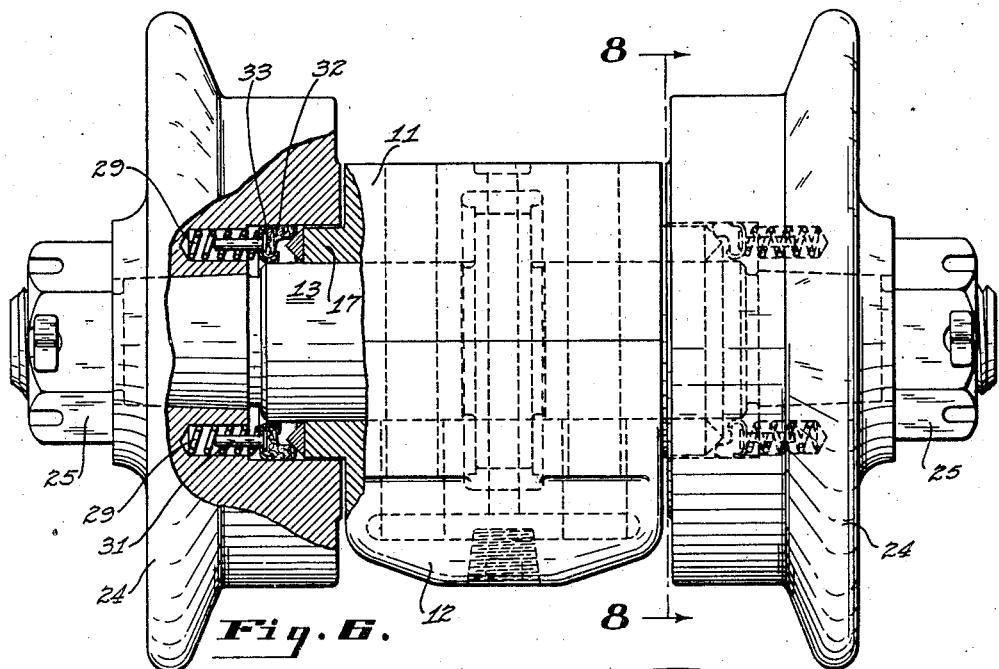
Fig. 6 is an elevational view, partially in section, showing a roller structure with a modified form of seal.

The sealing structure shown in Fig. 6 presents a modified form in which the end faces of the bearing extensions are flat, while the gaskets 32 are L-shaped and are carried by the ring 33 which is bent to secure the gaskets therewith as a unitary structure. In this form, there is a single wall of the gaskets wedged between the outer face of the discs and the rollers.

Figures 7, 8:
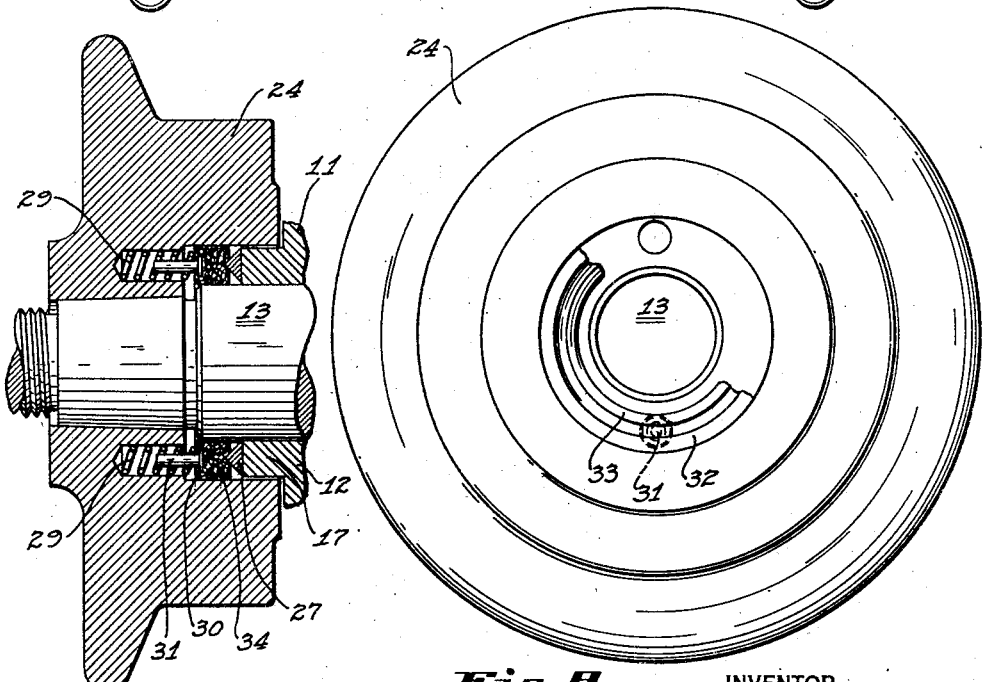
Fig. 7 is a sectional view of a portion of the roller structure showing a further modified form of seal.
Fig. 8 is a sectional view taken on line 8—8 of Fig. 6.

The sealing structure shown in Fig. 7 presents still another modified form in which solid gaskets 34 are pressed against the point of the triangular discs. In all of the forms of sealing means illustrated, the springs wedge the gaskets between the shaft and the inner roller walls, and against the discs.

Although this invention has been described in connection with certain specific embodiments, the principles involved are susceptible of numerous other applications which will readily occur to persons skilled in the art, and the invention is therefore to be limited only as indicated by the scope of the appended claims.

What I claim is:—

1. In a tractor supporting structure having a fixed shaft carrying bearing and a roller fixed on an end of the shaft and telescoping the end portion of the bearing, a sealing device at the end of the bearing and intermediate the roller and the shaft comprising a triangular metal disc surrounding the shaft and having one side engaging the end of the bearing, a waterproof flexible gasket surrounding the shaft adjacent the disc, and means pressing the gasket between the disc and the roller.

2. In a tractor supporting structure having a fixed shaft carrying bearing and a roller on an end of the shaft and telescoping the adjacent end of the bearing, a sealing device at the end of the bearing and between the roller and the shaft comprising a triangular metal disc surrounding the shaft within the roller and having one side engaging the end of the bearing, said disc being formed of wear resisting material, a gasket telescoping the apex of the disc, a retainer engaging the gasket, and a plurality of coil springs under compression engaging the retainer and spreading the gasket to seal the space between the roller and the shaft.

ROLLIN H. WHITE.